Dec. 4, 1951     O. B. VETTER     2,577,548
COMPENSATED SPECIFIC GRAVITY MEASURING DEVICE
Filed July 27, 1948     5 Sheets-Sheet 1

INVENTOR.
Otto B. Vetter.
BY
Regan and Regan
Att'ys

Dec. 4, 1951 O. B. VETTER 2,577,548
COMPENSATED SPECIFIC GRAVITY MEASURING DEVICE
Filed July 27, 1948 5 Sheets-Sheet 2

INVENTOR.
Otto B. Vetter.
BY
Kegan and Kegan
Att'ys

INVENTOR.
Otto B. Vetter.
BY
Kegan and Kegan
Att'ys

Dec. 4, 1951  O. B. VETTER  2,577,548
COMPENSATED SPECIFIC GRAVITY MEASURING DEVICE
Filed July 27, 1948  5 Sheets-Sheet 4

INVENTOR.
Otto B. Vetter.
BY Kegan and Kegan
Att'ys

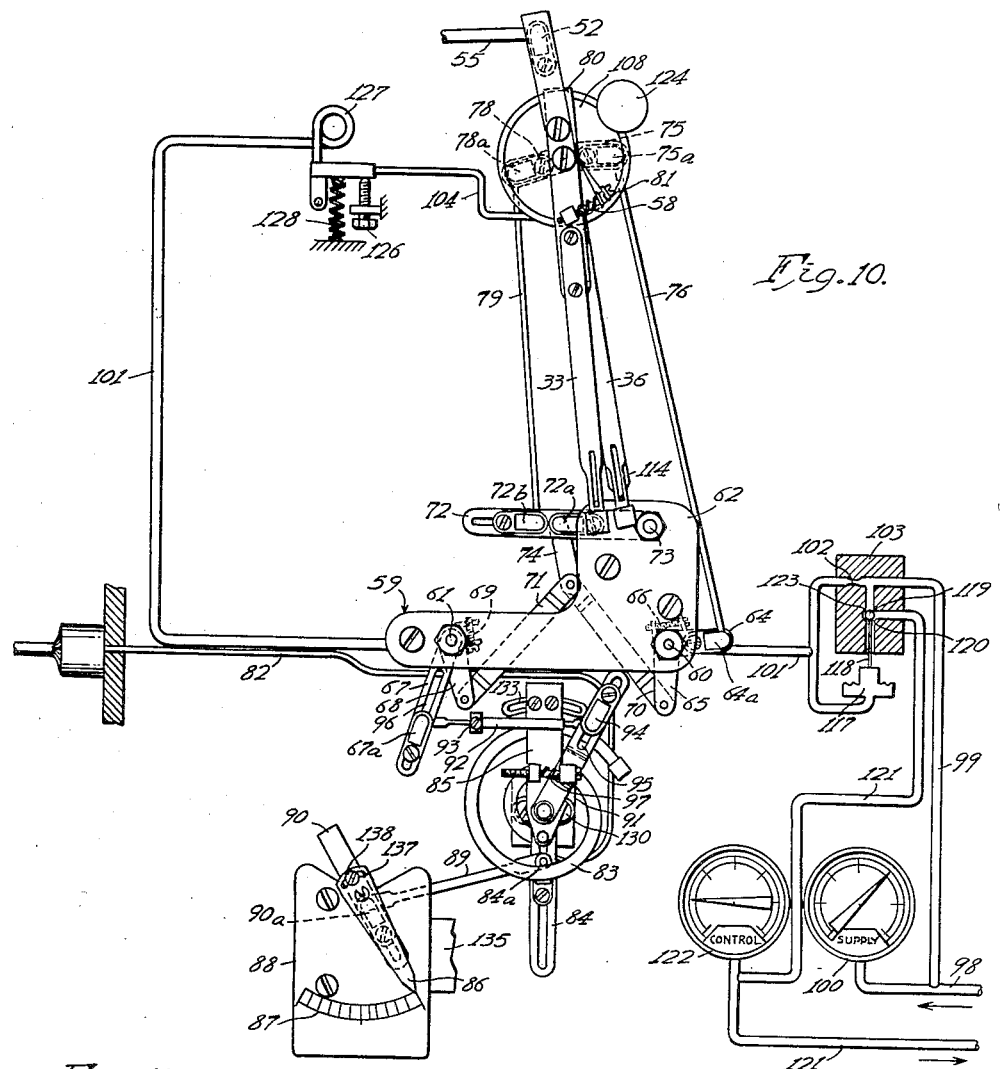

Patented Dec. 4, 1951

2,577,548

UNITED STATES PATENT OFFICE 2,577,548

COMPENSATED SPECIFIC GRAVITY MEASURING DEVICE

Otto B. Vetter, McKeesport, Pa., assignor to Hagan Corporation, Pittsburgh, Pa., a corporation of Pennsylvania Application July 27, 1948, Serial No. 40,944

7 Claims. (Cl. 73—32)

This invention relates generally to measuring devices, and more specifically to apparatus for measuring the specific gravity of a fluid as compensated for the effect of variables operating thereupon.

Accurate measurement of the specific gravity of a fluid based on a base or reference condition is often desired in chemical process work or the like. Specific gravity measurements can be used, for instance, as a measure of many other properties of fluids. Examples of such properties are the concentration of a substance in a solution, suspension or mixture; and the specific volume, specific weight or density of the fluid. Thus, for example, the regulation of the specific gravity of a solution serves as a simple means of regulating the proportionality between a solute and its solvent, provided the properties of each are known. Under these conditions, the measuring device regulating the specific gravity may be considered as being a proportionator. The desirability of having measuring devices of this type operate in a highly accurate fashion is at once apparent, since accuracy leads both to uniformity of final product and the maintenance of optimum operating conditions at critical steps in the process. Up to the present time, there has been a long felt want in the instrumentation field for a recording and control type instrument which accurately measures the specific gravity of a fluid as compensated for the effect of a secondary variable operating thereupon, as for example the temperature of said fluid.

Prior attempts directed at solving this problem have failed to produce an instrument which is accurate throughout the usual working range encountered. Stated briefly, the difficulty lies in providing compensating apparatus which is capable of superimposing a substantially constant corrective factor upon the uncorrected specific gravity as the latter varies while the value of the secondary variable remains constant. In addition, many installations require that the correction factor follow some non-linear function of the secondary variable. The compensating apparatus should therefore include means for extracting the particular function required.

Compensation devices which heretofore have been developed by the instrumentation art do not provide these requisites. Consequently, these compensation devices introduced an appreciable error into the measuring system. In most instances, the error stems from the fact that movement of the linkage which measures the uncorrected variable affects the magnitude of the correction factor which is applied, even though the value of the secondary variable remains constant. As a result, the correction factor which is actually applied to the uncorrected specific gravity unavoidably becomes a function of the latter. Consequently, for a given value of the secondary variable, a varying correction factor will be applied to the uncorrected variable as the value of the latter varies.

A principal object of my invention, therefore, is to provide compensating apparatus of improved construction which is capable of applying a constant correction to the uncorrected secific gravity as the latter varies, and which is further characterized by the ability to modify the secondary variable to the particular function required for accurate compensation.

Another object of the instant invention is the provision of apparatus of the type indicated which is characterized by a high degree of accuracy and reliability, and which may be quickly and easily adjusted to give the particular compensation charactertistic desired.

These, and other objects which will become apparent as this exposition proceeds, are fully satisfied by the present invention. In principal, my invention comprises adding together mechanically two deflections which reflect, respectively, the magnitude of the uncorrected specific gravity and the magnitude of the secondary variable which is to be superimposed thereon. Such mechanism responsive to the summation of these two displacements may in turn be utilized to maintain the specific gravity of the fluid at a desired reference condition, and/or record the uncorrected specific gravity corrected to this reference condition.

In order that my invention may be more fully disclosed, reference is had to the accompanying drawings which illustrate apparatus embodying the foregoing and such other principles, advantages or capabilities as may be pointed out as this description proceeds, or as are inherent in the present invention. For purposes of clarity in exposition, the following description is explicit, and the accompanying drawings are detailed, but it is distinctly to be understood that said exposition is illustrative only, and that my invention is not restricted to the particular details recited in the specification or shown in the drawings.

In the drawings:

Figure 10 is a front elevational view showing certain elements of the apparatus of Figure 2 as they appear when deflected;

Figure 11 is a rear elevational view taken on the line 11—11 of Figure 3, and

Figure 12 is a plan view taken on line 12—12 of Figure 11.

Like reference characters designate similar parts in the drawings and in the description of my invention which follows.

Figure 1:
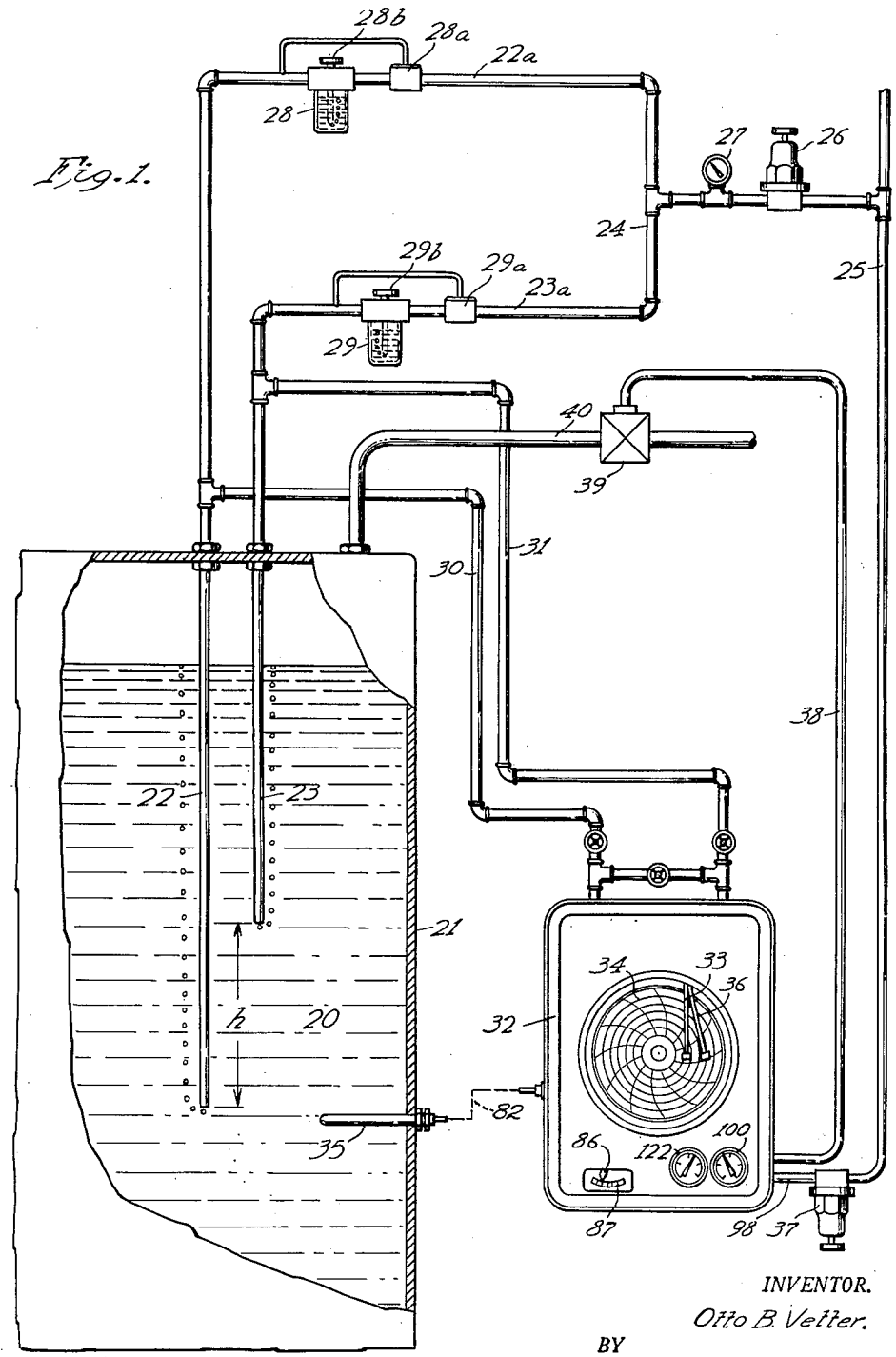
Figure 1 illustrates one form of control system for measuring and controlling the specific gravity of a fluid to which my invention is applicable.

In Figure 1, my invention is shown incorporated into a system for measuring the specific gravity of a liquid 20 contained within the vessel 21. For purposes of this exposition, it may be assumed that the liquid 20 is continually entering and leaving the vessel 21 and that the specific gravity of the exeunt liquid must be maintained at a prescribed value referred to a base temperature (usually either 60° F. or 0° C.). Under these circumstances the temperature of the liquid 20 constitutes the variable for which the specific gravity is being corrected.

The uncorrected specific gravity of the liquid 20 may be determined by measuring the pressure exerted by a column of the liquid 20 of known height. The apparatus of Figure 1 accomplishes this end by measuring the static pressure at two vertically spaced points within the liquid 20, and for this purpose two tubes 22 and 23 having their outlets spaced apart a distance $h$ are inserted within the vessel 21. The tube 22 is a part of the high pressure leg 22a of the parallel circuit 24, while the tube 23 is a part of the low pressure leg 23a of the circuit 24. Air or gas is introduced into the system from the supply line 25 through the pressure regulator 26. The gauge 27 exhibits the value of the regulated pressure. Flow regulating apparatus, as for example the bubble indicator 28 and the flow regulating valve 28a of the constant differential type, is inserted in the leg 23a, while a similar bubble indicator 29 and differential valve 29b are inserted in the leg 23a. Needle valves 28b and 29b provide means for adjusting the bubble rate of the indicators 28 and 29, so that the flow of gas or air to the tubes 22 and 23 may be made substantially equal. The valves 28a and 29a, sensitive to the pressure differential across the needle valve restrictions, maintain this equal flow. When the latter condition prevails, the pressure differential established across the tubes 22 and 23 is a true measure of the uncorrected specific gravity of the liquid 20. This pressure differential is transmitted through the conduits 30 and 31 to the measuring instrument 32 where it is translated into a deflection at the pen 33 which is proportional to the uncorrected specific gravity. The pen 33 records this instantaneous value on the chart 34.

Impulses generated by the sensitive bulb 35 in response to temperature variations within the liquid 20 are also transmitted to the instrument 32. These impulses are utilized, in a manner described in detail hereinafter, to correct the uncorrected specific gravity back to a preselected reference or base condition. The corrected value of specific gravity is recorded on the chart 34 by the pen 36. At the same time, the impulses responsive to changes in the temperature of the liquid 20 are used to actuate a control system (described in detail below) operating as an integral part of the instrument 32. This system is exemplified as being of the pneumatic type, and receives a regulated supply of air or gas through the pressure regulator 37. Briefly, the system in effect acts to throttle the constant pressure output of the pressure regulator 37 to a value which reflects any deviation of the corrected specific gravity from the reference value selected. Variations in the control pressure are transmitted through the conduit 38 to a dilution control valve 39 the purpose of which is to regulate the amount of liquid flowing to the vessel 21 through the inlet pipe 40. By controlling this flow, the liquid 20 is diluted in the amount necessary to maintain the corrected specific gravity of the effluent liquid at the preselected reference condition.

Figure 2:
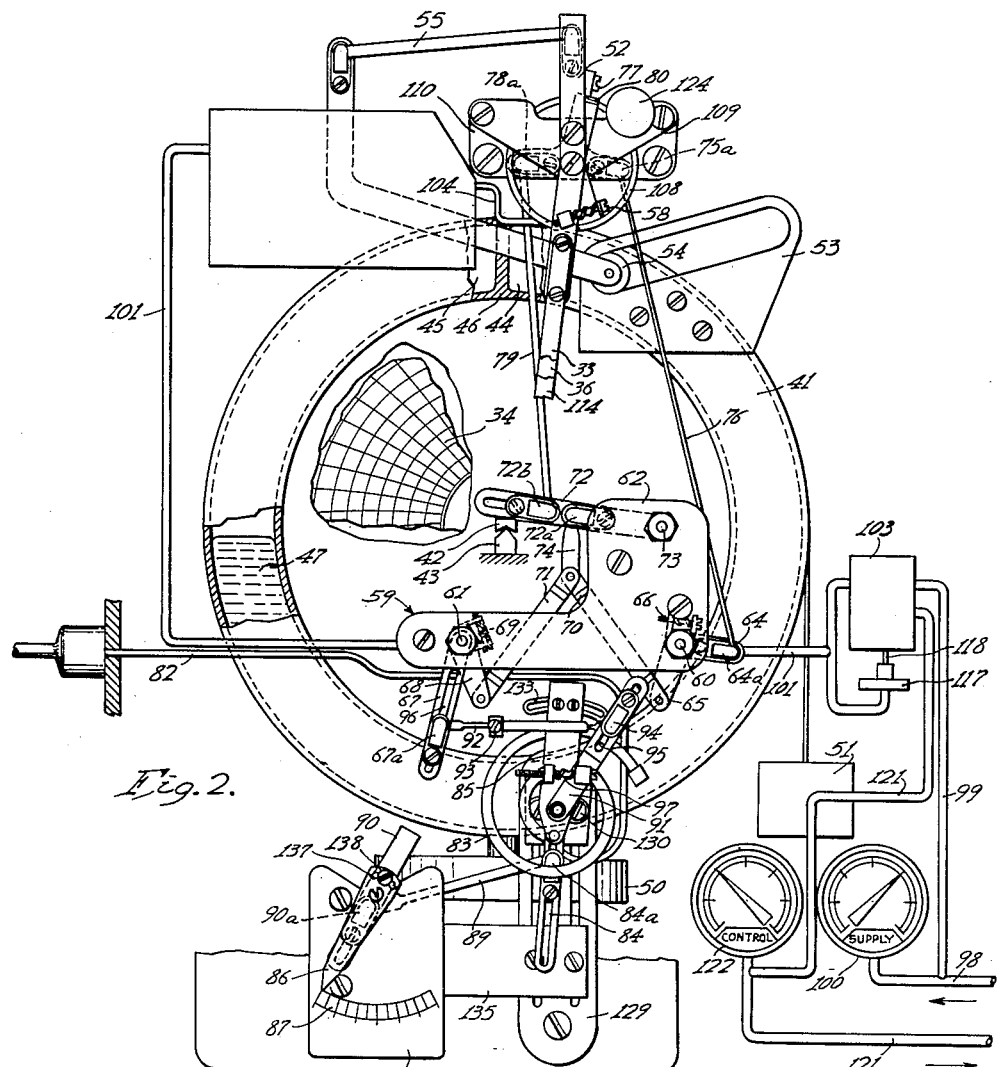
Figure 2 is a front elevational view, partly schematic, of a preferred embodiment of my invention, portions thereof being broken away to illustrate structural details.
Figure 3:
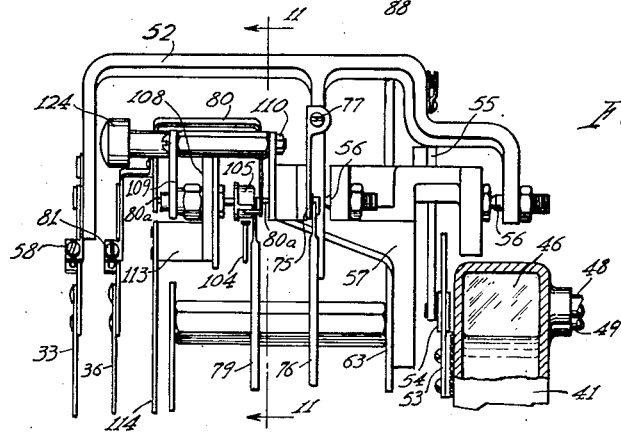
Figure 3 is a fragmentary side elevational view showing the yoke assembly of Figure 2.

Referring now to Figures 2 and 3, the instrument 32 is shown as including a hollow torus 41 which rotates on its axle 42 about a fulcrum or center support 43. The torus 41 is divided internally into two compartments 44 and 45 by a partition 46 and a body of liquid 47. The compartments 44 and 45 communicate with the conduits 30 and 31 (Figure 1) through the pressure inlets 48 and 49, respectively. A pressure differential is thereby established across the partition 46, as a consequence of which the torus 41 tends to rotate. This rotation is opposed however by a counterforce generated by displacement of the range weight 50 and the suppression weight 51 from their respective null positions. Thus, for example, where the operating range of the instrument 32 is to be between the values of 1.0 and 1.1 (uncorrected specific gravity referred to water) and the vertical spacing of $h$ of the emersed tubes 22 and 23 is 10 inches, then the suppression weight 51 must be equivalent to 10 inches of water and the range weight 50 must be equivalent to $(10 \times 1.1) - (10 \times 1.0)$, or 1 inch of water.

Thus the rotation of the torus 41 in response to the pressure differential established by the tubes 22 and 23 is a direct measure of the uncorrected specific gravity referred to water. Rotary motion of the torus 41 is transmitted to the yoke 52 through the conjoint action of the linear cam 53, the cam follower 54, and the connecting linkage 55. As best shown in Figure 3, the yoke 52 turns on the pivots 56, 56 anchored in the frame 57. Angular deflection of the yoke 52 about the pivots 56, 56 is recorded by the pen 33 on the chart 34. The null position of the pen 33 relative to the yoke 52 may be adjusted by means of the adjustment screw 58.

Referring now more specifically to Figure 2, the numeral 59 designates a summation linkage, the theory and operation of which are set out in full in my co-pending patent application, Serial Number 10,109, filed February 21, 1948, now Patent No. 2,527,282, and entitled Totalizing Mechanism. Stated briefly, the summation linkage includes a pair of shafts 60 and 61, journalled between the plates 62 and 63 (the latter shown in Figure 3). An arm 64 and a crank 65 are carried by the shaft 60. An adjusting element 66 is provided to permit adjustment of the angularity between the arm 64 and crank 65.

Similarly, an arm 67 and a crank 68 are secured to the shaft 61, the angularity therebetween being adjustable by means of the adjustment element 69. The cranks 65 and 68 are interconnected by the links 70 and 71. A third crank 72 is mounted on the shaft 73 and is pivotably connected to a follower 74 at the pivot assembly 72a. Through the agency of the follower 74, the movement of the links 70 and 71 is transmitted into a rotary displacement at the crank 72. As disclosed in the application above identified, so long as the cranks 65 and 68 deflect through arcs of the order of 30 degrees or less, the angular deflection of the crank 72, with reference to some null position, is directly proportional to the sum of the deflections of the cranks 65 and 68. And, since the cranks 65 and 68 are coupled directly to and driven by the arms 64 and 67, the deflection of the crank 72 is also proportional to the sum of the deflection of said arms.

As the yoke 52 rotates, its movement is followed by the arm 75 and the pivot assembly 75a thereon. A drive link 76 interconnects the pivot assembly 75a and a similar pivot assembly 64a carried by the arm 64, whereby the latter follows the movement of the yoke 52. The relative angularity between the yoke 52 and the arm 64 may be adjusted by means of the adjustment screw 77. The crank 72, following the movement of the arm 64 (and hence the crank 65), positions the arm 78 through the drive link 79 pivoted at the pivot assemblies 78a and 72b. As the arm 78 deflects, it turns the yoke 80 about the pins 80a, 80a. The angular deflection of the yoke 80 is exhibited by the displacement of the pen 36, which records upon the chart 34. The null position of the pen 36 may be adjusted by means of the adjustment screw 81.

Accordingly, as the yoke 52 deflects in response to changes in the magnitude of uncorrected specific gravity of the liquid 20, a proportionate increment of deflection is imparted to the yoke 80, and hence the pen 36, through the summation linkage 59. In operation, the maximum value of this proportionate increment of deflection will usually equal 100% of the total chart travel, since customarily the chart range of the uncorrected value is the same as that of the corrected value.

Figure 4:
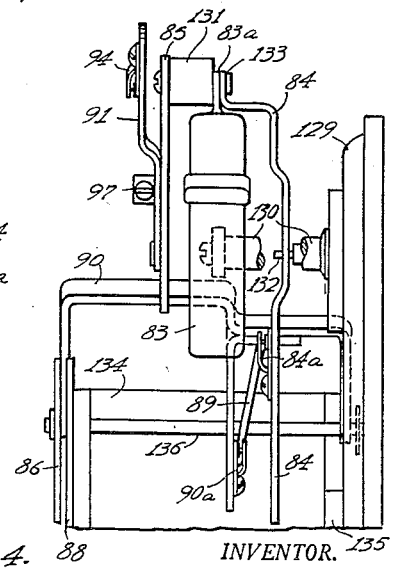
Figure 4 is a fragmentary side elevational view of the Bourdon tube mechanism of Figure 2.

Referring now to Figures 1, 2 and 4, changes in the temperature of the liquid 20 are transmitted by the sensitive bulb 35 through tubing 82 to a temperature indicating device, as for example the Bourdon tube 83 adjustably anchored to the base 129 by the supports 130, 130. These variations in temperature are reflected by the rotary displacement of the arm 85 secured to the stud 83a (Figure 4) projecting from the Bourdon tube 83 and spaced therefrom by the spacer 131. The lever 84, pivoted about the center guide 132, also reflects these temperature variations, and is adjustable relative to the Bourdon tube 83 and arm 85 by moving the slotted section 133 of the lever 84 relative to the stud 129. A direct measurement of the position of the arm 85 and lever 84 in terms of temperature is exhibited by the displacement of the pointer 86 relative to the graduations 87 on the plate 88, fastened to the bracket 134 (Figure 4), which in turn is adjustably anchored to the base 129 by the bracket arm 135. The drive mechanism between the pointer 86 and the lever 84 comprises a drive link 89, and a yoke 90 rotatable about the axle 136. The drive link 89 is pivotably coupled to the yoke 90 at the pivot assembly 90a, and is pivotably coupled to the lever 84 at the pivot assembly 84a. Adjustment of the pointer 86 and the yoke 90 is obtained through the slot 137 and the securing screw 138. Any movement of the arm 85 deflects in similar fashion the lever 91 carried thereon. An adjustable-length drive link 92 interconnects the lever 91 and the arm 67; the set screw 93 providing means for clamping the link 92 at the particular length desired. To change the effective lever arm of the lever 91, the pivot assembly 94 is moved along the slot 95. Similarly, the lever arm of the arm 67 may be changed by adjusting the pivot assembly 67a along the slot 96. By means of the adjustment screw 97 the lever 91 may be repositioned relative to the arm 67 without disturbing the position of either the arm 85 or the lever 84.

Variations in temperature of the liquid 20 are therefore reflected by corresponding movements of the pointer 86 and the lever 91. And, since the arm 67 is actuated by the lever 91, a proportional increment of deflection is exhibited by the pen 36 through the medium of the summation linkage 59, irrespective of the position of the arm 64 and crank 65. The deflection of the pen therefore reflects the summation of the movements of the arms 64 and 67. Since the displacement of the arm 64 is a measure of the uncorrected specific gravity of the liquid 20 and the displacement of the arm 67 reflects the magnitude of the temperature of the liquid 20, it therefore follows that the displacement of the pen 36 is composed of the uncorrected specific gravity plus or minus a temperature correction factor.

Figure 5:
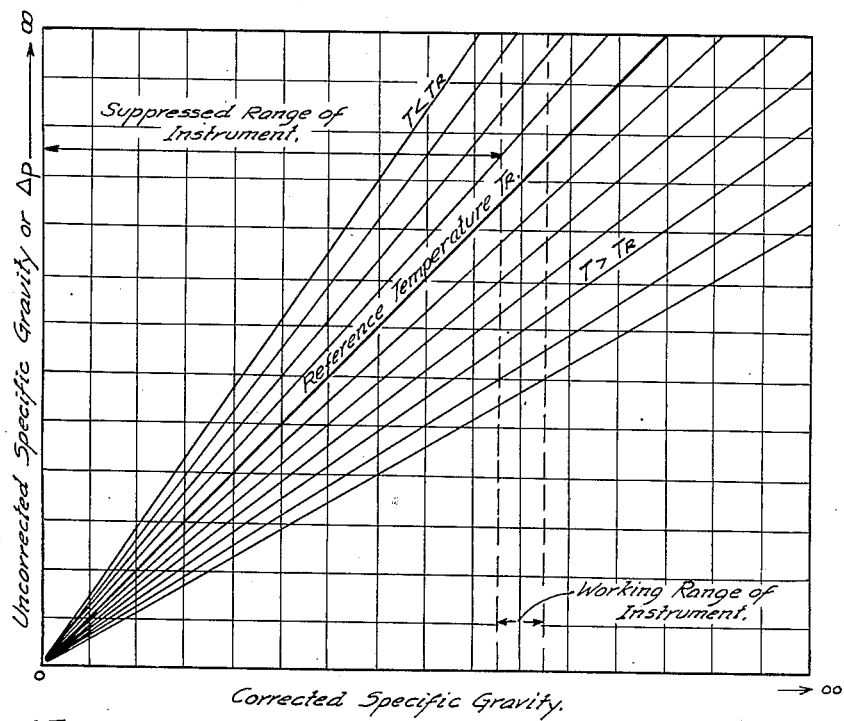
Figures 5 through 8 illustrate in graphical form some of the basic compensation characteristics which my invention provides.

Advantageously, this type of compensation is precisely that which is required for accurate compensation of the specific gravity of a liquid for temperature effects. This will become more apparent upon consideration of Figure 5, wherein is shown an exemplary plot of the relationship between uncorrected specific gravity and corrected specific gravity. It will be observed that the constant temperature lines diverge uniformly from the theoretical zero point of specific gravity. Considering the plot as a whole, to compensate the uncorrected specific gravity at one temperature to the specific gravity at the reference temperature, it is necessary to apply a different amount of correction for different values of specific gravity. Thus, as the uncorrected specific gravity increases, the amount of compensation required to correct back to the base condition increases proportionately. This theoretical situation is not of practical importance, however, inasmuch as the instrument is normally suppressed and the working range used is quite narrow. Also, the temperature range encountered is much smaller than that depicted in Figure 5. In practice, the working range of the instrument is so small compared to the total range illustrated in Figure 5 that the temperature lines may be considered parallel without introducing any significant error.

Figure 6:
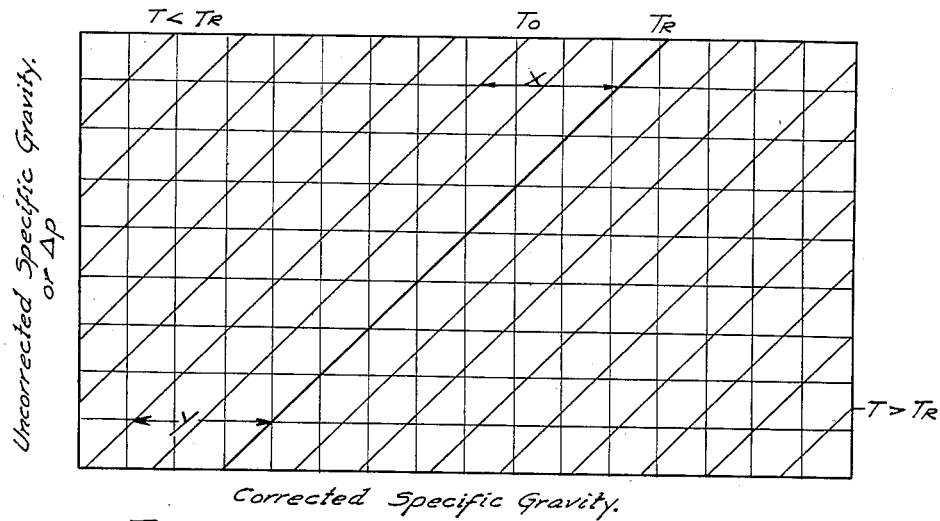
Figure 7:
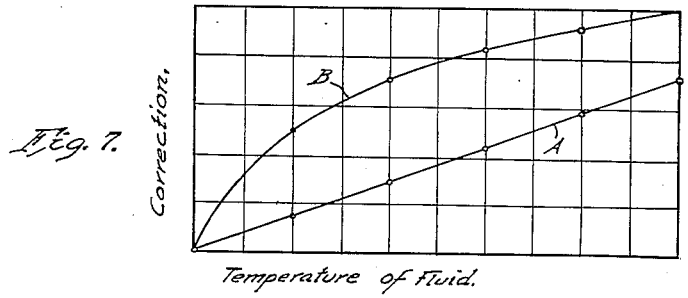

Figure 6 illustrates a typical working range encountered in specific gravity compensation. As indicated above, the high approximation to parallelism which exists between any two temperature lines makes it necessary to apply a constant correction factor as between any two values of temperature as the specific gravity fluctuates. Thus, if the temperature of the liquid 20 is equal to $T_o$, and the reference temperature is $T_r$, then the correction factor $x$ must be equal to the correction factor $y$ even though the value of uncorrected specific gravity is different in each case. In the example of Figure 6, the amount of correction which is required is proportional to the difference between the actual temperature and the reference temperature, so that the plot of correction versus temperature is linear, as shown by curve A of Figure 7. In such cases, it is essential that the arm 67 deflect directly proportional to the deflection of the lever 91, since the displacement of the latter is directly proportional to the absolute temperature of the liquid 20. This relation is secured by positioning the lever 91 relative to the arm 67 in the manner shown in Figure 2.

Figure 9:
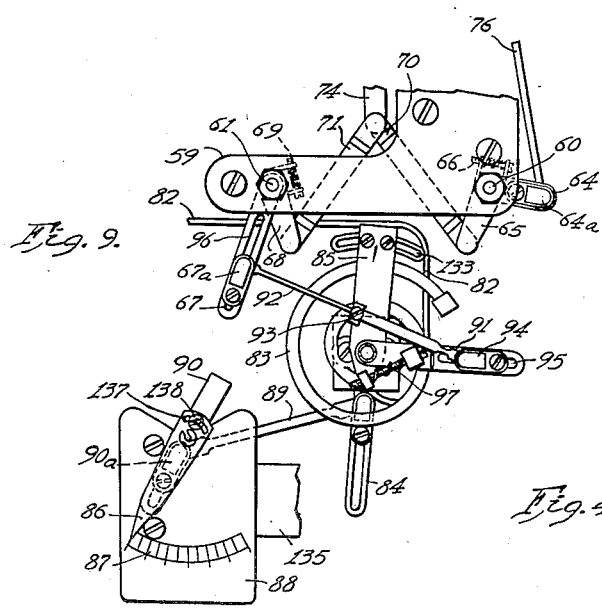
Figure 9 is a front elevational view illustrating the adjustability of a portion of the apparatus shown in Figure 2.
Figure 8:
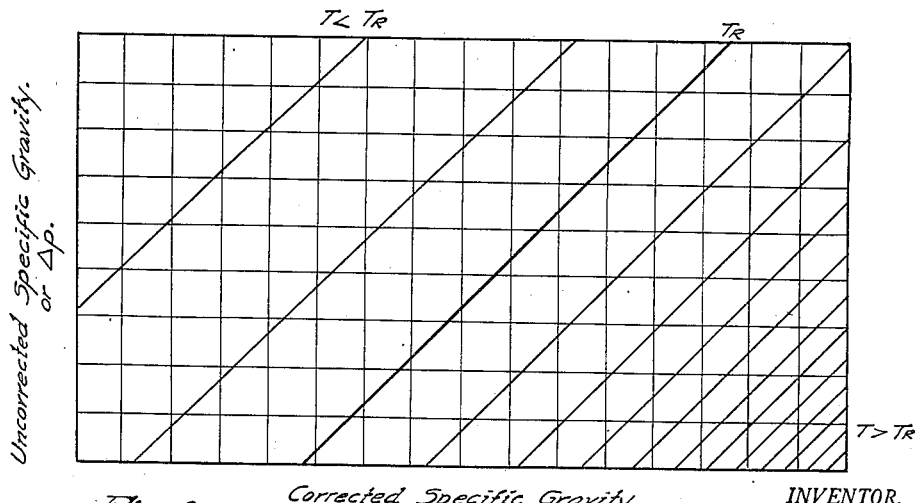

On the other hand, certain installations may require that the relation between the actual temperature and the amount of correction applied to the uncorrected specific gravity be some function other than linear. This would be the case, for example, where solids suspended in the liquid 20 go into solution as the temperature increases, the resultant plot being similar to that illustrated in Figure 8. Under this set of conditions, the plot of correction versus temperature will not follow a linear function, but will take a shape comparable to curve B of Figure 7. When this condition obtains, it is necessary that the relative positions of the lever 91 and the arm 67 be such that the movement of the arm 67 follows the function of curve B with respect to the movement of the lever 91. This effect is readily accomplished in the instant invention by changing the angularity of the lever 91 with respect to the Bourdon tube take-off arm 85 by means of the adjustment screw 97. When the lever 91 is moved to a new position the effective length of the drive link 92 is changed correspondingly in the manner described above so that the position of the arm 67 is not disturbed. The angularity between the lever 91 and the arm 67 may be increased still further by changing the position of the adjusting screw 97 in the manner shown in Figure 9. It will be noted that this latter adjustment has no effect upon the motion transmitted by the Bourdon tube 83 to the pointer 86.

It will be apparent to those skilled in the art that the apparatus thus far described accurately compensates the specific gravity of a fluid for the effects of a secondary variable, and exhibits and/or records the corrected value obtained thereby. Advantageously, my invention may also be used in conjunction with various types of control mechanism for accurately regulating the specific gravity of a fluid. By way of illustrating how my invention is adapted for such use, the drawings, and particularly Figures 1, 2 and 10, show a pneumatic type control system which is actuated through movement of the yoke 80 (and its dependent linkage) to maintain the specific gravity of the liquid 20 at a reference condition.

Referring now to Figure 10, this exemplary control system is shown as including an inlet conduit 98 through which a constant pressure supply of air is introduced to the tubing 99, and a pressure gauge 100. The air supply flowing to the tubing 101 is throttled through the orifice 102 within the control unit 103. Consequently, since the flow through the orifice 102 is substantially constant, it follows that the pressure within the tubing 101 is a measure of the rapidity with which the air bleeds from the jet 104, or the distance between the jet 104 and the baffle 105 (Figure 11). The baffle 105 is carried on a flapper 106 which is pivoted at one end on a pivot pin 107 secured to the wheel 108. Said wheel 108 is pivotably supported between the spaced bracket members 109 and 110, and consists of a disk 111 and a gear ring 112 secured thereto. The wheel 108 carries a bracket 113 to which a set pointer 114 is attached. The other end of the flapper 106 rests on a pin 115 projecting from the arm 116, the latter forming an integral part of the yoke 80. Thus, movement of the yoke 80 under the combined influence of variations in the uncorrected specific gravity and/or the temperature of the liquid 20, deflects the pin 115, thereby causing the flapper 106 to rotate about the pivot pin 107. As the flapper 106 moves, the distance between the jet 104 and the baffle 105 is changed. For example, where the uncorrected specific gravity suddenly increases, the yoke 80 of Figure 10 moves in a clockwise direction, thereby moving the baffle 105 upward and away from the jet 104. This change in position of the baffle 105 results in a lowered impedance to the escape of air from the jet 104, as a consequence of which the back pressure within the tubing 101 decreases. A decrease in the back pressure causes the bellows 117 to move the valve stem 118 downwardly, so that the valve 119 seats upon the lower valve seat 120. This downward movement of the valve 119 causes the pressure within the tubing 121 to increase, which increased pressure is transmitted through the conduit 38 to the dilution control valve 39. The magnitude of this pressure is indicated by the gauge 122. Typically, an increase in pressure opens up the control valve 39 and increases the dilution flow through the inlet pipe 40, thereby acting to decrease the specific gravity of the liquid 20 within the vessel 21 until the reference condition is reached. When the specific gravity of the liquid 20 returns to the reference condition, the yoke 80 and the baffle 105 return to the set position, as a consequence of which the back pressure within the tubing 101 increases. The increased pressure inflates the bellows 117 and moves the valve 119 to a position intermediate the lower valve seat 120 and the upper valve seat 123. The final position of the valve 119 is that which normally maintains the specific gravity at the set or reference condition.

To change the set point of the corrected specific gravity to a new value, the wheel 108 is turned until the set pointer 114 registers the new set point on the chart 34. The wheel 108 is repositioned by turning the knob 124, thereby rotating a pinion 125 which meshes with the gear ring 112. Changing the angular position of the wheel 108 displaces the pivot pin 107 correspondingly and thereby repositions the flapper 106 so as to change the distance between the baffle 105 and the jet 104. Where the set point is moved from the lower limit of the working range, as shown in Figure 2, to the intermediate position of Figure 10, adjustment of the knob 124 moves the pin 107 clockwise (Figure 11), thereby displacing the flapper 106 and baffle 105 downwardly. This downward movement decreases the distance between the baffle 105 and the jet 104 and causes the back pressure within the tubing 103 to increase. As the back pressure builds up, the valve 119 moves upwardly and seats against the valve seat 123 and shuts off the flow of air to the tubing 121. As a result, air within the tubing 121 escapes around the valve stem 118 and the pressure in the tubing 121 and conduit 38 is reduced. This reduction in pressure closes down the valve 39, reduces the dilution flow through the inlet piping 40 and allows the specific gravity to build up. As the specific gravity increases, the pen 36 and yoke 80 deflect in a clockwise direction (Figure 11), as a consequence of which the pen 115 picks up the flapper 106 and moves the baffle 105 away from the jet 104. The final, equilibrium condition which prevails results in a reduced pressure in the tubing 121 and conduit 38, which reacts on the dilution control valve 39 to reduce the flow through the pipe 40 from that which occurs in the arrangement of Figure 2. Since this condition demands that the valve 119 be moved toward the valve seat 123, the back pressure in the tubing 101 must be greater than was the case in Figure 2; hence, the resultant movement of the pivot pin 107 and pin 115 under the foregoing effects moves the baffle 105 downwardly to the proper position. Should there be any deviation from the point at which the system comes to rest and the specific gravity indicated by the set pointer 114, this difference may be compensated for by moving the jet 104 relative to the baffle 105. This adjustment is accomplished by adjusting the micrometer screw 126, thereby flexing the tubing 101 at the helix portion 127. A spring 128 eliminates slack and holds the jet 104 firmly in its new position.

In Figure 2, the temperature of the liquid 20 is shown to be at the reference condition inasmuch as the pen 33 and the pen 36 coincide. Figure 10 illustrates the effect which an increase in temperature has upon the instrument 32. This increase in temperature is indicated by the new position of the pointer 86. As the temperature rises to a value greater than the base temperature, the magnitude of the uncorrected specific gravity becomes less than the corrected specific gravity, and hence the angular deflection of the pen 33 is less than that of the pen 36 and the set pointer 114. In the usual case, a maximum temperature variation deflects the arm 67 an amount which is sufficient to cause the pen 36 to deflect through about 8% to 10% of the total chart travel. Thus the maximum deflection of the crank 65 is approximately ten times that of the crank 68.

It will therefore be apparent to those skilled in the art that all of the objects of my invention have been achieved. Accurate measurement of specific gravity as compensated for the effects of secondary variables operating thereupon, as for example temperature, is obtained through my invention. In addition, if desired, my invention may be used with control apparatus to maintain the specific gravity of a fluid at a specified base or reference condition.

While I have shown and described certain embodiments of my invention, it is to be understood that these embodiments have been given by way of example only and that various changes and rearrangements of the details shown herein may be made without departing from the spirit of the invention, the scope of which is defined in the appended claims.

I claim:

1. Apparatus for totalizing a first factor proportional to the uncorrected specific gravity of a fluid and a second factor proportional to the magnitude of the temperature of said fluid, said apparatus comprising: a Bourdon tube responsive to said temperature, a stud projecting from the outer convolution of said Bourdon tube, a first arm secured to said stud and disposed radially with respect to said Bourdon tube, first pivot means coaxial with the effective center of rotation of said first arm, a first lever mounted on said pivot means and adjustable relative to said stud, indicating means driven by said first lever, a second lever pivotably secured to said first arm at said effective center of rotation, means for adjusting the angularity between said second lever and said first arm, said second lever having a first slot therein, second pivot means adjustable along said first slot, a first shaft and a second arm mounted thereon, said second arm having a second slot therein, third pivot means adjustable along said second slot, an adjustable-length link pivotably connected at the two ends thereof to said second and third pivot means, respectively, whereby the position of said second arm reflects the magnitude of said first factor; an element measuring said uncorrected specific gravity, a second shaft and a third arm mounted thereon, drive means between said element and said third arm, whereby the position of said third arm reflects the magnitude of said second factor; two cranks secured to said first and second shafts respectively, a third crank, two links pivotably coupled to said two cranks, respectively, a third link pivotably coupled to said third crank and drivably interconnecting the same with said two links, whereby the deflection of each of said two cranks is transmitted through the respective link coupled thereto to said third link and said third crank, and whereby the deflection of said third crank is the algebraic sum of the deflections of said two cranks.

2. In a measuring device of the character described, apparatus comprising a Bourdon tube deflected in accordance with the magnitude of a first variable, a take-off arm secured to said Bourdon tube, a lever pivoted about the effective center of rotation of said take-off arm, means for angularly adjusting said lever relative to said arm, a first shaft and a first arm mounted thereon, an adjustable-length link interconnecting said lever and said arm, a second shaft and a second arm mounted thereon, said second arm positioned in accordance with the magnitude of a second variable, two cranks secured to said first and second shafts, respectively, a third crank, two links pivotably coupled to said two cranks, respectively, a third link pivotably coupled to said third crank and drivably interconnecting the same with said two links, whereby the deflection of each of said two cranks is transmitted through the respective link coupled thereto to said third link and said third crank, and whereby the deflection of said third crank is the algebraic sum of the deflections of said two cranks.

3. Apparatus for totalizing a first factor proportional to the uncorrected specific gravity of a fluid and a second factor proportional to a variable affecting said uncorrected specific gravity, said apparatus comprising: an element turning in response to variations in said variable, a lever, means pivoting said lever coaxially with said element, means for adjusting the angularity between said element and said lever, a first shaft and a first arm mounted thereon, an adjustable-length drive link between said lever and said first arm, a first crank mounted on said shaft and turning therewith; a second shaft and a second arm mounted thereon, means for positioning said second arm in accordance with variations in said uncorrected specific gravity, a second crank mounted on said second shaft and turning therewith; a rotatable member; and linkage between said first and second cranks and said rotatable member which includes a follower pivoted to said rotatable member to drive the same, a first link drivably connecting said first crank and said follower, and a second link drivably connecting said second crank and said follower, whereby said rotatable member deflects in accordance with variations in the algebraic sum of said two factors.

4. In a measuring device of the character described, apparatus comprising an element deflecting in accordance with the magnitude of a first variable, a first member carried by said element, means for adjusting the angularity between said element and said member, a first pivot and a first arm turning thereon, an adjustable-length drive link between said first member and said arm, a second pivot and a second arm turning thereon in accordance with the magnitude of a second variable, a first crank turning on said first pivot and driven by said first arm, a second crank turning on said second pivot and driven by said second arm, a rotatable member and a follower pivotally connected thereto to drive said rotatable member, pivot means on said follower, a first link drivably connecting said first crank and said pivot means on said follower, and a second link drivably connecting said second crank and said pivot means on said follower, whereby said rotatable member is deflected proportional to the total of the deflections of said cranks.

5. In a measuring device of the character described, apparatus comprising: a Bourdon tube deflecting in accordance with the magnitude of a first variable, an arm secured to said Bourdon tube, a lever pivoted about the effective center of rotation of said arm, means for adjusting the angularity between said lever and said arm, two crank members and two pivot means, one of said pivot means for each of said crank members, an adjustable-length link interconnecting said lever and one of said crank members, means positioning the other of said crank members in accordance with the magnitude of a second variable, a pair of links pivotally coupled together and to said first and second crank members, respectively, a guided member, and means interconnecting said links and said guided member, whereby said guided member displaces proportional to the total deflections of said first and second crank members.

6. Apparatus for measuring the specific gravity of a liquid corrected for the effects of variations in temperature of said liquid about a base temperature, said apparatus comprising: means for measuring the pressure within said liquid at two vertically spaced points; a measuring element of the tilting manometer type; means for transmitting said pressures to said element whereby the latter deflects proportional to said specific gravity uncorrected for temperature; a first crank member and pivot means therefor; means actuated by said measuring element and connected to said first crank member to position the latter in accordance with the magnitude of the uncorrected specific gravity; a Bourdon tube responsive to the temperature of said liquid; an arm moved by said Bourdon tube; a second crank member and pivot means therefor; linkage drivably connecting said arm to said second crank member and including means for adjusting the angularity between said second crank member and said arm; a rotatable member and a follower pivotally connected thereto to drive said rotatable member; pivot means on said follower; a first link drivably connecting said first crank member and said pivot means on said follower; and a second link drivably connecting said second crank member and said pivot means on said follower, whereby said rotatable member is deflected proportional to the total of the deflections of said crank members.

7. Apparatus for measuring the specific gravity of a fluid corrected for the effects of a variable factor, comprising: a first pivoted member; means for deflecting said member in accordance with the magnitude of the specific gravity uncorrected for said variable factor; a second pivoted member; means for deflecting said second member in accordance with the magnitude of said variable factor; and means for totalizing and exhibiting the deflections of said members, said means including first rotatable crank means; linkage interconnecting said crank means and said first member, second rotatable crank means, other linkage interconnecting said second crank means and said second member, a guided member and a link driving the same, a first connector drivably connecting said first crank means and said link, a second connector drivably connecting said second crank means and said link, said link and said connectors operating whereby the deflection of said guided member is the algebraic sum of the deflections of said first and second crank means.

OTTO B. VETTER.

REFERENCES CITED

The following references are of record in the file of this patent:

UNITED STATES PATENTS

| Number | Name | Date |
| --- | --- | --- |
| 1,210,180 | Logan | Dec. 26, 1916 |
| 1,962,324 | Noble | June 12, 1934 |
| 2,093,254 | Spitzglass et al. | Sept. 14, 1937 |
| 2,272,970 | Frymoyer | Feb. 10, 1942 |
| 2,382,853 | Brammer | Aug. 14, 1945 |
| 2,394,549 | Howe | Feb. 12, 1946 |
| 2,445,255 | Younkin | July 13, 1948 |